(12) United States Patent
Swayne

(10) Patent No.: US 8,555,191 B1
(45) Date of Patent: *Oct. 8, 2013

(54) METHOD, SYSTEM, AND APPARATUS FOR KEYSTROKE ENTRY WITHOUT A KEYBOARD INPUT DEVICE

(75) Inventor: Patrick Swayne, Lawrenceville, GA (US)

(73) Assignee: American Megatrends, Inc., Norcross, GA (US)

( * ) Notice: Subject to any disclaimer, the term of this patent is extended or adjusted under 35 U.S.C. 154(b) by 845 days.

This patent is subject to a terminal disclaimer.

(21) Appl. No.: 12/720,798

(22) Filed: Mar. 10, 2010

Related U.S. Application Data

(63) Continuation of application No. 11/337,389, filed on Jan. 23, 2006, now Pat. No. 7,703,035.

(51) Int. Cl.
*G06F 3/14* (2006.01)

(52) U.S. Cl.
USPC ............................ 715/773; 715/863; 345/173

(58) Field of Classification Search
USPC .......... 715/200–277, 700–867; 700/701–866; 709/201–229; 705/50–79; 345/30–111
See application file for complete search history.

(56) References Cited

U.S. PATENT DOCUMENTS

| | | | |
|---|---|---|---|
| 5,748,512 A | 5/1998 | Vargas | |
| 6,094,197 A * | 7/2000 | Buxton et al. | 715/863 |
| 6,525,717 B1 | 2/2003 | Tang | |
| 6,801,190 B1 * | 10/2004 | Robinson et al. | 345/173 |
| 6,938,220 B1 | 8/2005 | Shigematsu et al. | |
| 2004/0183833 A1 | 9/2004 | Chua | |
| 2006/0028450 A1 | 2/2006 | Suraqui | |
| 2006/0036677 A1 | 2/2006 | Stout et al. | |
| 2006/0053387 A1 | 3/2006 | Ording | |
| 2006/0265208 A1 | 11/2006 | Assadollahi | |
| 2008/0301575 A1 | 12/2008 | Fermon | |

OTHER PUBLICATIONS

U.S. Official Action dated Mar. 4, 2008 in U.S. Appl. No. 11/337,389.
U.S. Official Action dated Oct. 15, 2008 in U.S. Appl. No. 11/337,389.
U.S. Official Action dated Apr. 2, 2009 in U.S. Appl. No. 11/337,389.
U.S. Notice of Allowance / Allowability dated Nov. 16, 2009 in U.S. Appl. No. 11/337,389.

* cited by examiner

*Primary Examiner* — Ruay Ho
(74) *Attorney, Agent, or Firm* — Hope Baldauff, LLC

(57) ABSTRACT

A method, system, and apparatus for entering alpha-numeric and non-alpha numeric data without the use of a keyboard input device are provided. According to one method, a grid is displayed on a display screen that includes one or more alpha-numeric characters. Distinguishing characters are displayed adjacent to each alpha-numeric character. In response to receiving a selection within the grid, a determination is made as to whether the selected location contains an alpha-numeric character and, if so, a further determination is made as to whether a distinguishing character is present on two sides of the selected location. If a distinguishing character is present on two sides of the selected location, then the character located at the selected location is entered into a keyboard buffer as if a keyboard input device had been utilized to type the character. The grid may also include character strings corresponding to non-alphanumeric keystrokes that may be selected and entered into the keyboard buffer in a similar manner.

16 Claims, 4 Drawing Sheets

METHOD, SYSTEM, AND APPARATUS FOR KEYSTROKE ENTRY WITHOUT A KEYBOARD INPUT DEVICE

CROSS-REFERENCE TO RELATED APPLICATIONS

This application is a continuation of U.S. patent application Ser. No. 11/337,389 entitled "Method, System, and Apparatus for Keystroke Entry Without a Keyboard Input Device," filed Jan. 23, 2006, now U.S. Pat. No. 7,703,035, issued Apr. 20, 2010, which is expressly incorporated herein by reference in its entirety.

TECHNICAL FIELD

The present invention is related to the field of computer input devices. More particularly, the present invention is related to the field of receiving keystroke input in a computer system that is not equipped with a physical keyboard input device.

BACKGROUND OF THE INVENTION

Many types of computer systems utilize a basic input/output system ("BIOS"), or an extensible firmware interface ("EFI") firmware, to control various aspects of the computer system. In particular, the BIOS is utilized to perform a power on self-test, to initialize the various hardware components within the computer system, and to provide an interface between an operating system executing on the computer system and the hardware. In many computer systems the BIOS also provides a setup utility program through which a user may configure various aspects of the operation of the computer system.

BIOS setup utilities typically rely on a keyboard input device for receiving user input. However, many types of computers are not equipped with a keyboard input device. For instance, some server computers may not be equipped with a keyboard. Similarly, modern pen-based computers typically do not include a keyboard and instead rely primarily on a pen and touchscreen for receiving user input. Other computers may be purposely equipped with a mouse input device but no keyboard.

Some parameters settable within a BIOS setup utility are presented to the user as multiple choice menu selections. Because these parameters are presented within a menu, they can easily be specified using only a mouse or pen-based input device. However, some parameters within typical BIOS setup utilities require the entry of alpha-numeric characters (e.g. A-Z, 0-9) or other types of keystrokes (an "enter" key for example). For instance, it may be necessary to set a password within the BIOS setup utility. Entering alpha-numeric characters without the use of a keyboard requires a special user interface configured for this type of input.

One way that BIOS designers have enabled keystroke input in a BIOS setup utility without the use of a keyboard is through the use of a virtual on-screen keyboard. In these previous solutions, a matrix of selectable characters is displayed on screen. A user may then utilize a mouse or pen to select one of the keys to be entered. These types of virtual on-screen keyboards have usually been implemented utilizing a table stored in the BIOS that defines each character in the virtual on-screen keyboard and the coordinates of the on-screen location at which the character is displayed. When input is received from the pen or mouse at a particular on-screen location, the table is consulted to determine if a character is defined within the table at the selected on-screen location. If a character is defined in the table at the selected on-screen location, the character is deemed to have been entered.

While prior art methods that utilize a character table for determining input keystrokes perform reasonably well, the character table utilized by these previous systems requires a considerable amount of storage space within the typically small capacity electrically erasable and programmable read only memory ("EEPROM") device utilized to store the firmware. Moreover, the character table must be synchronized exactly with the on-screen display. Each time the on-screen display is changed, the table must be updated to reflect the change. This can be an arduous and time consuming process for a BIOS programmer. Accordingly, there is a need for a method, system, and apparatus for receiving keystroke input in the absence of a keyboard input device that does not utilize a table for storing character locations and therefore utilizes significantly less memory than prior art methods and that does not require synchronization of a table with an on screen display.

It is with respect to these considerations and others that the present invention has been made.

SUMMARY OF THE INVENTION

In accordance with the present invention, the above and other problems are solved by a method, system, and apparatus for enabling keystroke entry without a keyboard input device. According to aspects of the invention, a non-keyboard input device may be utilized to select locations within an on-screen grid that includes alpha-numeric characters. A keystroke recognition process determines the character located at the selected location and returns the result as if it was generated by a keystroke. Because no character table is utilized, valuable BIOS memory space is saved and no synchronization is required between a character table and the on-screen display.

According to one method provided by an embodiment of the invention, a grid is displayed on a display screen that includes one or more alpha-numeric characters. Alpha-numeric characters are the characters A-Z and 0-9 in the Latin alphabet. The grid may be constructed from text mode characters. Each alpha-numeric character in the grid is also flanked on two or more sides by a distinguishing character. A distinguishing character is a character that is utilized to distinguish an alpha-numeric character from other surrounding characters. For instance, a blank space character may be used as a distinguishing character in embodiments of the invention.

A non-keyboard input device, such as a mouse or a pen input device, may be utilized to move a selection pointer, or cursor, to a location within the grid. The input device may also be utilized to select a location within the grid. For instance, a mouse button may be utilized to select a location within the grid. In response to receiving such a selection, a determination is made as to whether the selected location contains an alpha-numeric character. If the selected location contains an alpha-numeric character, a further determination is made as to whether a distinguishing character is present on two sides of the selected location. If a distinguishing character is present on two sides of the selected location, then the character located at the selected location is entered into a keyboard buffer as if a keyboard input device had been utilized to type the character.

If the selected location within the grid does not contain an alpha-numeric character, a determination is made as to whether the selected location contains a distinguishing character. If the selected location contains a distinguishing character, a further determination is made as to whether a location adjacent to the selected location contains an alpha-numeric character. If a location adjacent location contains an alpha-numeric character, then the character located at the adjacent location is entered into a keyboard buffer as if a keyboard input device had been utilized to type the character. In this manner, a selection made within each cell of the grid may be utilized to enter an alpha-numeric character even if the location containing the character is not selected precisely.

According to embodiments of the invention, the grid may also include character strings corresponding to non-alphanumeric keystrokes. For instance, character strings may be included corresponding to the enter key, the backspace key, an escape key, a function key, or other types of keys. If the selected location includes an alpha-numeric character and it is determined that a distinguishing character does not exist on both sides of the selected location, a determination may then be made as to whether the character at the selected location is part of a recognizable character string. For instance, if the alpha-numeric character at the selected location is an "E" then a determination may be made as to whether the "E" is part of the character string "ENT" corresponding to the "enter" keystroke. If the character at the selected location is part of a recognizable character string, then the keystroke corresponding to the recognized character string is entered into a keyboard buffer as if the keystroke had been typed on a keyboard. In this manner, keystrokes for non-alphanumeric characters may be entered without the use of a keyboard input device.

The above-described aspects of the invention may also be implemented as a computer-controlled apparatus, a computer process, a computing system, an apparatus, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
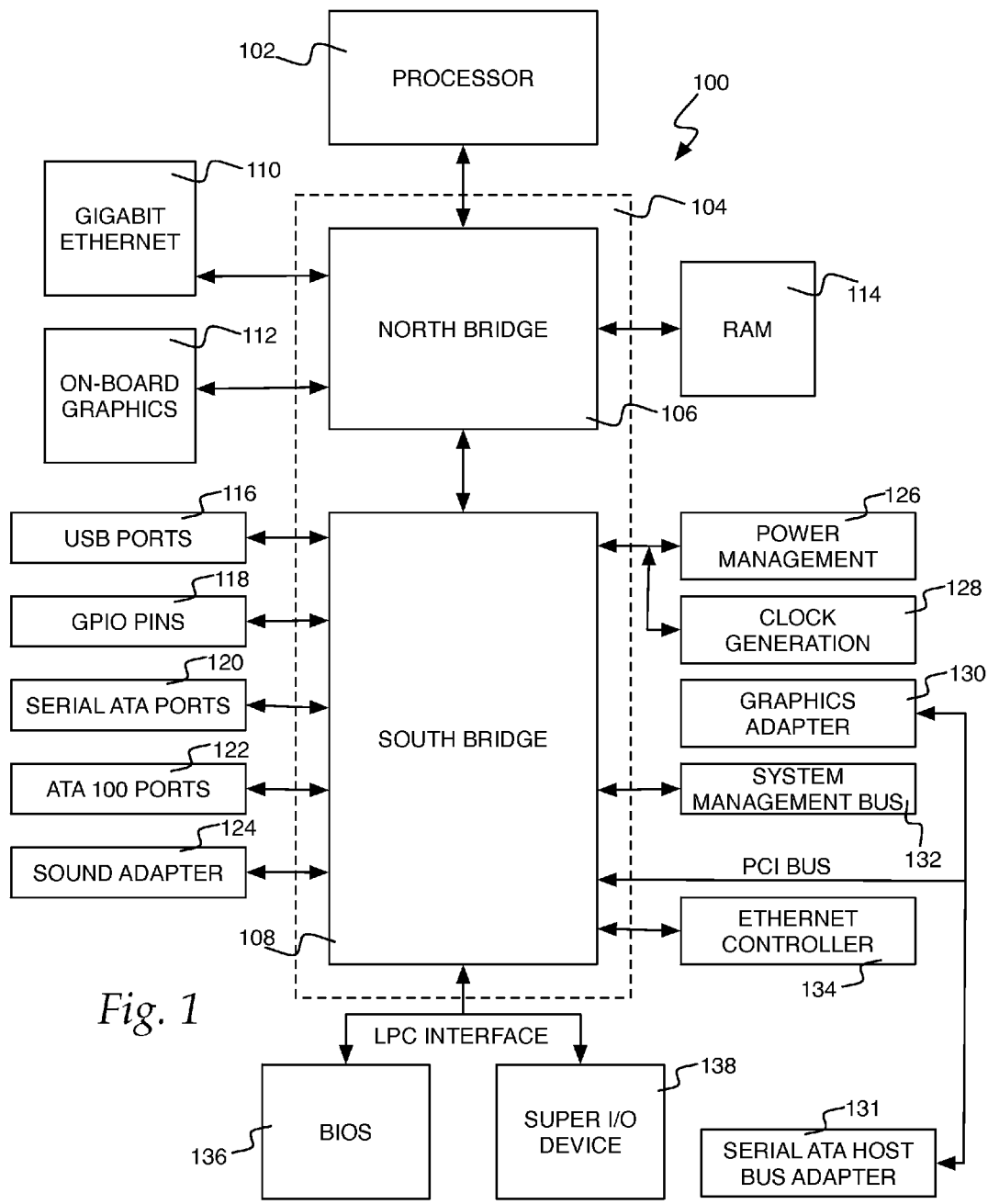
FIG. 1 is a computer architecture diagram showing aspects of a computer utilized as an illustrative operating environment for the various embodiments of the invention.

Embodiments of the present invention provide a method, system, apparatus, and computer-readable medium for enabling keystroke input without the use of a keyboard input device. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable computing environment in which the invention may be implemented. Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the invention will be provided. In particular, FIG. 1 illustrates a computer architecture for practicing the embodiments of the present invention. It should be appreciated, however, that although the embodiments of the invention described herein are discussed in the context of a conventional desktop, laptop, pen computer, or server computer, the embodiments of the invention may be utilized with virtually any type of computing device.

As described briefly above, the embodiments of the invention provide a method, system, apparatus, and computer-readable medium for enabling keystroke input without the use of a keyboard input device. FIG. 1 illustrates a computer 100 that, as will be described in greater detail below, enables a user to enter keystrokes utilizing a mouse, a pen tablet input device, or virtually any other type of non-keyboard input device. It should be appreciated that the architecture of the computer 100 is merely illustrative and that any type of computer capable of displaying a virtual keyboard and receiving user input from an input device other than a keyboard may be utilized.

An illustrative computer architecture for practicing the various embodiments of the invention will now be described. In particular, the computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processing unit that performs arithmetic and logical operations necessary for the operation of the computer 100.

The chipset 104 includes a north bridge 106 and a south bridge 108. The north bridge 106 provides an interface between the CPU 102 and the remainder of the computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the computer 100 to another computer via a network. Connections which may be made by the network adapter 110 may include local area network ("LAN") or wide area network ("WAN") connections. LAN and WAN networking environments are commonplace in offices, enterprise-wide computer networks, intranets, and the Internet. The north bridge 106 is connected to the south bridge 108.

The south bridge 108 is responsible for controlling many of the input/output functions of the computer 100. In particular, the south bridge 108 may provide one or more universal serial bus ("USB") ports 116, a sound adapter 124, an Ethernet controller 134, and one or more general purpose input/output ("GPIO") pins 122. The south bridge 108 may also provide a system management bus 132 for use in managing the various components of the computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus. The PCI bus may also be utilized to interface with one or more HBAs, such as the serial ATA HBA 131.

According to embodiments, the south bridge 108 is an enhanced south bridge operative to provide a HBA for connecting mass storage devices to the computer 100 without the use of an add-in card such as the PCI HBA 131. For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user.

The mass storage devices connected to the south bridge 108, and its associated computer-readable media, provide non-volatile storage for the computer 100. Although the description of computer-readable media contained herein refers to a mass storage device, such as a hard disk or CD-ROM drive, it should be appreciated by those skilled in the art that computer-readable media can be any available media that can be accessed by the computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, a touch screen input, and other types of input/output ports. The LPC interface may also connect a read-only memory ("ROM") device for storing a basic input/output system ("BIOS") 136 or an extensible firmware interface ("EFI") compatible firmware that includes program code containing the basic routines that help to start up the computer 100 and to transfer information between elements within the computer 100. It should be appreciated that the computer 100 may comprise other types of computing devices, including hand-held computers, embedded computer systems, personal digital assistants, and other types of computing devices known to those skilled in the art. It is also contemplated that the computer 100 may not include all of the components shown in FIG. 1, may include other components that are not explicitly shown in FIG. 1, or may utilize an architecture completely different than that shown in FIG. 1.

According to embodiments of the invention, the BIOS 136 is operative to provide a setup utility program through which a user may configure various aspects of the operation of the computer 100. In particular, the setup utility provided by the BIOS 136 allows the user to set various parameters that control the operation of the computer 100. In order to set these parameters, a user may utilize a keyboard input device connected to the Super I/O device 138. According to embodiments of the invention, a user may also utilize a mouse, pen-based, or touch screen input device to enter keystrokes in the setup utility provided by the BIOS 136 in the absence of a connected keyboard. It should be appreciated that although the embodiments of the invention are described in the context of entering keystrokes in a BIOS-provided setup utility, the embodiments of the invention may be utilized to enable keystroke entry without a keyboard in virtually any type of application program or operating system program.

According to embodiments of the invention, the BIOS 136 utilizes a text mode provided by the on-board graphics adapter 112 or the graphics adapter 130 to display the user interface for the setup utility. The user interface may be displayed on a display device, such as a video monitor, connected to either of the adapters 112 or 130. The user may interact with the setup utility to select various menus, options, and to make various selections utilizing the mouse or pen-based input device connected to the Super I/O device 138. From time to time, it may be necessary for a user to enter keystrokes into the setup utility provided by the BIOS 136. For instance, in order to specify a password, it may be necessary to enter alpha-numeric characters. Similarly, it may also be necessary to enter non-alphanumeric characters to navigate the various menus provided by the setup utility and to perform other functions. For instance, it may be frequently necessary to enter an "escape" character or an "enter character." An illustrative user interface provided in one embodiment of the invention for entering alpha-numeric and non-alphanumeric keystrokes in this manner is described below with reference to FIGS. 2A-2B.

Figure 2A:
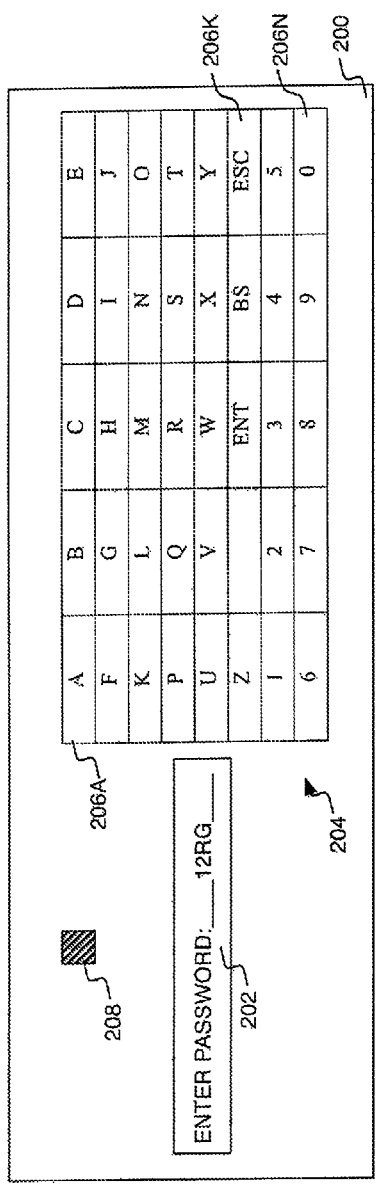
FIGS. 2A-2B are screen display diagrams showing aspects of an illustrative screen display provided by embodiments of the invention for receiving keystroke data in the absence of a keyboard input device.

Turning now to FIG. 2A, additional details regarding a user interface provided by embodiments of the invention for enabling the entry of keystrokes without a keyboard will be described. In particular, FIG. 2A shows an illustrative screen display 200. The screen display 200 is generated by the setup utility executing within the BIOS 136. The screen display 200 includes a grid 204 for entering keystrokes without the use of a keyboard. In particular, the grid 204 is made up of cells 206A-206N, also referred to herein as rectangles.

Some of the cells 206A-206N in the grid 200 include an alpha-numeric character. For instance, the cell 206A includes the character "A." Other of the cells 206A-206N include a character string that corresponds to a non-alphanumeric character. For instance, the cell 206K includes the character string "ESC" that corresponds to an "escape" keystroke. Other cells may be included with character strings corresponding to an enter key ("ENT"), a backspace key ("BS"), or a function key.

It should be appreciated that the grid 204 may be displayed when it becomes necessary for a user to enter keystrokes when no keyboard is connected to the computer 100.

As also shown in FIG. 2A, the setup utility within the BIOS 136 may be operative to display a text entry box 202 for receiving keyboard input from a user. According to embodiments, a non-keyboard input device and the grid 204 may be utilized to enter keystrokes into the text entry box 202. In particular, a non-keyboard input device may be utilized to move a cursor 208 to various positions within the grid 204. A selection may be made of the various positions and, in response to such a selection, a selected alpha-numeric character or non-alphanumeric character may be entered into a keyboard buffer of the Super I/O device 138. In this manner, it appears to the computer 100 that a keystroke was actually typed on a connected keyboard even though no keyboard is actually physically connected to the computer 100. Additional details regarding this process are provided below with respect to FIGS. 2B-4.

Figure 2B:
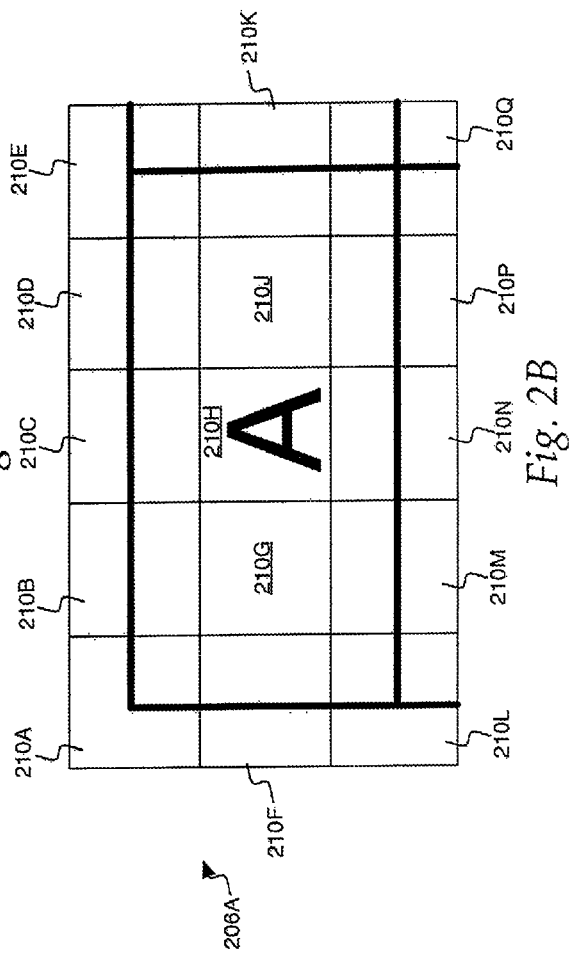

Referring now to FIG. 2B, additional details regarding the grid 204 utilized in the embodiments of the invention will be described. As shown in FIG. 2B, each cell within the grid 204 is formed from a number of text characters. For instance, the cell 206A shown in FIG. 2B is formed from characters located at positions 210A-210Q. In particular, text characters suitable for creating a grid structure are located at positions 210A-210E, 210F, 210K, and 210L-210Q. The alpha-numeric character "A" is located at position 210H.

The positions 210G and 210J of the cell 206A include a distinguishing character. A distinguishing character is a character utilized to distinguish an alpha-numeric character from other surrounding characters. In this manner, each alpha-numeric character in the grid 204 is flanked on both sides by a distinguishing character. According to embodiments, the distinguishing character may be a blank space character as illustrated in FIG. 2B. Other suitable characters may be also utilized as distinguishing characters. The distinguishing characters may also be placed above and below the alpha-numeric character or on all sides of the alpha-numeric character. It should be appreciated that the other cells 206B-206N of the grid 204 may be formed in a similar way to the cell 206A shown in FIG. 2B.

Figure 3:
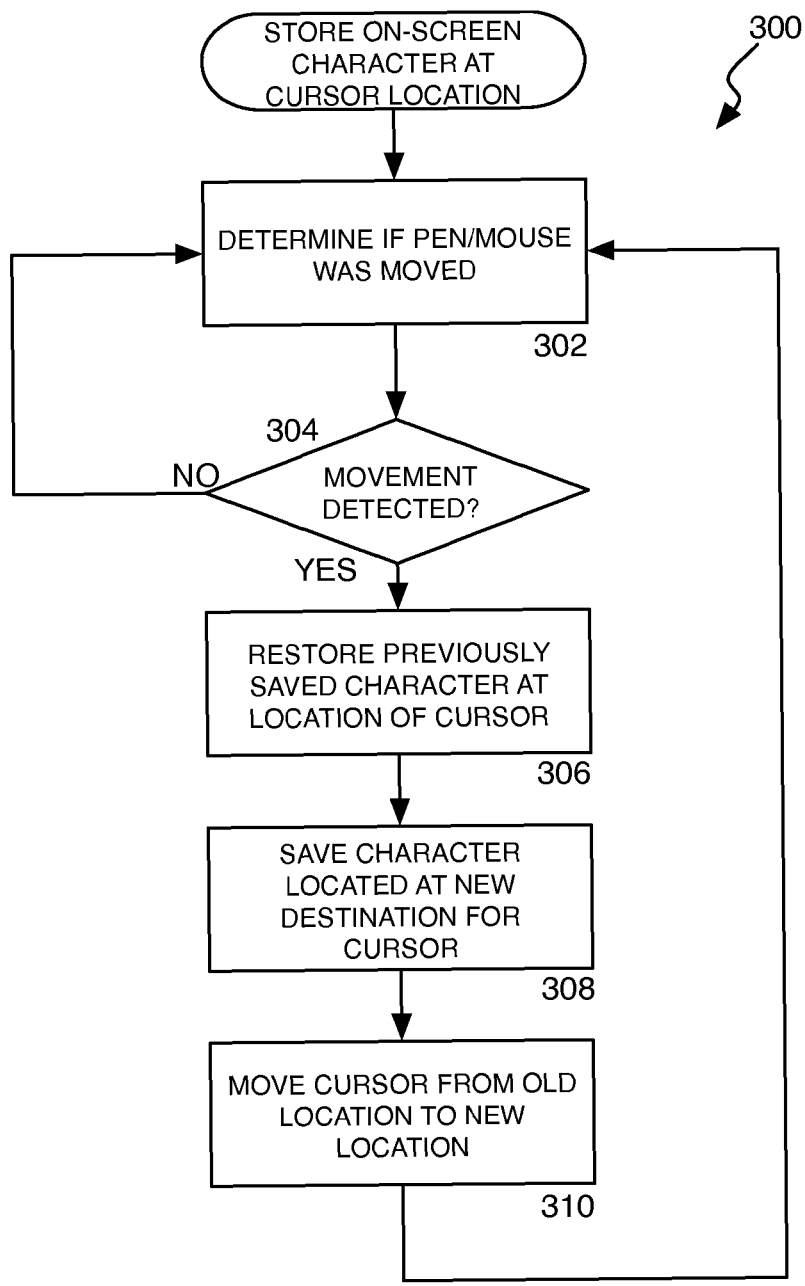
FIGS. 3-4 are flow diagrams showing various routines provided by the embodiments of the invention for enabling keystroke input without a keyboard input device according to embodiments of the invention.

Referring now to FIG. 3, additional details regarding the operation of the computer 100 for enabling keystroke input without the use of a keyboard input device will be provided. In particular, a routine 300 will be described illustrating operations performed by BIOS 136 for storing the character located at a current position of a cursor and restoring the character when the cursor is moved. It should be appreciated that the logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations of FIGS. 3 and 4 and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

It should be appreciated that when the cursor 208 is moved over the various locations within the grid 204, the characters over which the cursor is moved must be saved so that they can later be restored to the display when the cursor moves away. This process is performed by the BIOS 136 so that the display of the cursor 208 will not overwrite characters shown on the display screen as it is moved. The result of the performance of this process is that the character that was previously located at the current position of the cursor 208 is available for examination. This data is utilized by the embodiments of the invention to determine the character that is "under" the cursor when a selection is received on the input device, such as a mouse click or a pen tap. Additional details regarding a process for moving the mouse cursor and saving and restoring character information is provided below.

The routine 300 begins at operations 302 and 304, where a determination is made as to whether the non-keyboard input device, such as a pen or mouse, has been moved. If no movement has been detected, the routine 300 branches from operation 304 back to operation 302, where another such determination is made. If movement has been detected, the routine 300 continues from operation 304 to operation 306.

At operation 306, a previously saved character is restored to the current location of the cursor. In this manner, a character is restored that was displayed at the location of the cursor before the cursor moved to that location. The routine 300 then continues to operation 308, where the character located at the new destination for the cursor is saved to memory. The routine 300 then continues from operation 308 to operation 310 where the cursor 208 is moved from its current location to the new location in response to the movement. The routine 300 then continues from operation 310 back to operation 302 where another determination is made as to whether the cursor 208 has been moved. It should be appreciated that the routine 300 causes the character located at the current location of the cursor 208 to be available. This information is utilized to determine whether a key has been selected in the grid 204 for entry. Additional details regarding this process are provided below with respect to FIG. 4.

Figure 4:
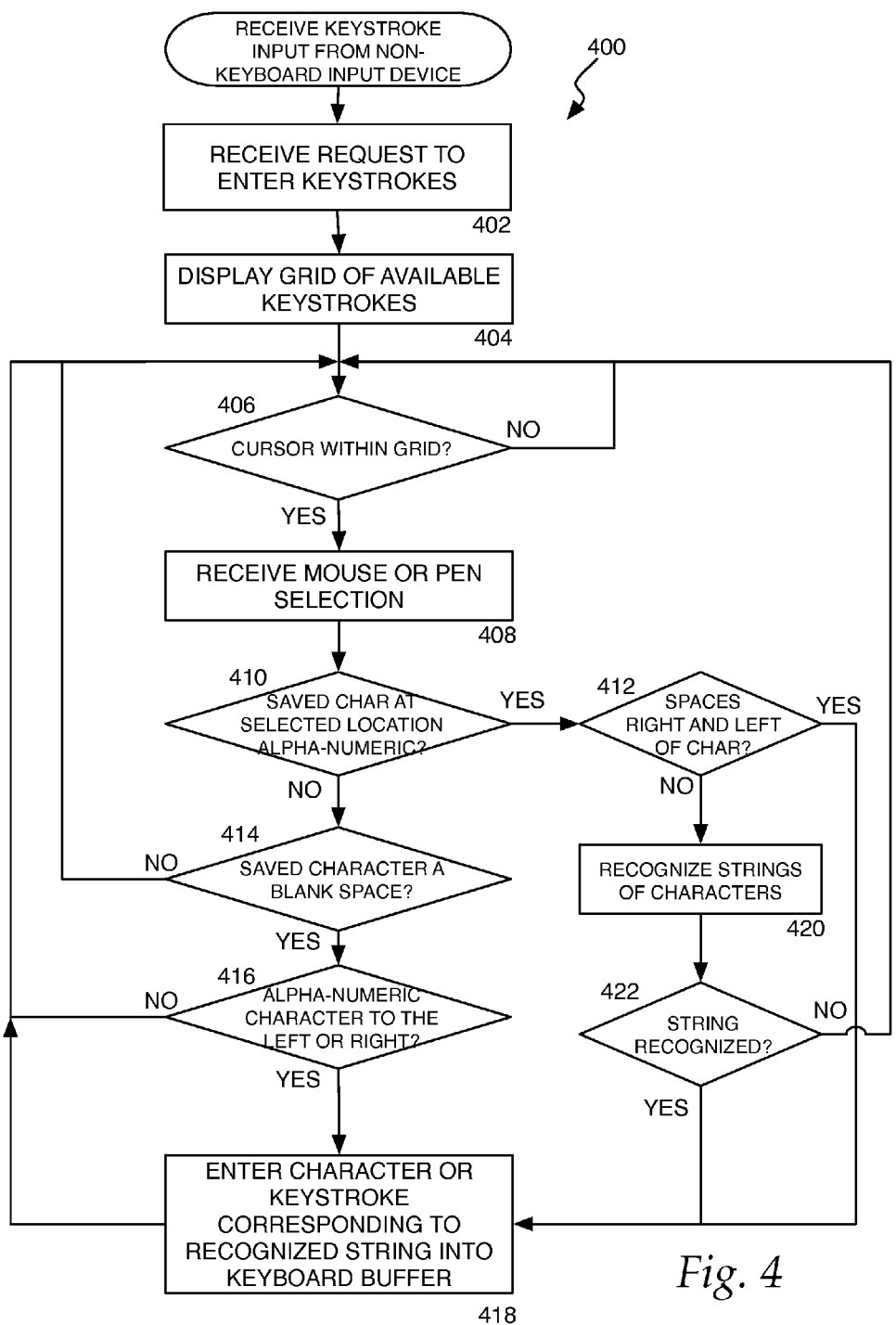

Turning now to FIG. 4, an illustrative routine 400 will be described for enabling keystroke entry without the use of a keyboard input device according to one embodiment of the invention. The routine 400 begins at operation 402, where a request is received to enter keystrokes with a non-keyboard input device. This may occur, for instance, if it is necessary for a user to provide a password or other text data in a text input box 202 without the use of a keyboard. In response to such a request, the grid 204 is displayed by the BIOS 136 at operation 404. From operation 404, the routine 400 continues to operation 406.

At operation 406, the BIOS 136 determines whether the cursor 208 is within the bounds of the grid 204. If the cursor 208 is not within the bounds of the grid 204, the routine 400 branches back to operation 406 where another such determination is made. If the cursor 208 is within the grid 204, the routine 400 continues to operation 408 where a selection is received from the input device, such as a mouse click, a pen tap, or other equivalent selection mechanism. In response to such a selection, the routine 400 continues to operation 410, where a determination is made as to whether the character previously located at the current location of the cursor 208 (and saved as set forth above with respect to FIG. 3), is an alpha-numeric character.

If, at operation 410, it is determined that the character is an alpha-numeric character, the routine 400 branches to operation 412, where a determination is made as to whether the positions adjacent to the selected location contain a distinguishing character. If a distinguishing character is present at these locations, the routine 400 branches from operation 412 to operation 418, where the character located at the current location of the cursor is entered into the keyboard buffer provided by the Super I/O device 138 so that the keystroke appears to the computer 100 to have been entered by an attached keyboard.

If, at operation 412, it is determined that distinguishing characters are not present adjacent to the selected location within the grid 204, the routine 400 continues from operation 412 to operation 420. At operation 420, an attempt is made to recognize a string that includes the character at the selected location. The contents of adjacent locations may be considered when attempting to recognize a string. For instance, using the example shown in FIG. 2A, if the selected location is the position of the "S" in cell 206K, the string recognition algorithm may examine characters to the left of the selected location and to the right of the selected location in order to determine that the selected location is a part of a recognizable string. By performing this process, the BIOS 136 would recognize that the string comprising "ESC" had been selected.

At operation 422, a determination is made as to whether a string has been recognized. If a string has not been recognized, no valid selection has been made and the routine 400 returns to operation 406, described above. If a string is recognized, the routine 400 continues to operation 418 where the keystroke corresponding to the recognized string is placed in the keyboard buffer so that the keystroke appears to the computer 100 to have been typed on a keyboard. As an example, if the "ESC" string contained in cell 206K is recognized as having been selected, the ASCII code corresponding to the "escape" character will be placed in the keyboard buffer. In this manner, keystrokes corresponding to non-alphanumeric characters may be entered without the use of a keyboard.

If, at operation 410, it is determined that the character at the selected location is not an alpha-numeric character, the routine 400 continues from operation 410 to operation 414. At operation 414, a determination is made as to whether the character at the selected location is a distinguishing character. If the character at the selected location is not a distinguishing character, the routine 400 branches from operation 414 back to operation 406. If the character at the selected location is a distinguishing character, the routine 400 continues from operation 414 to operation 416.

At operation 416, a determination is made as to whether an alpha-numeric character exists at a location adjacent to the selected location. If an alpha-numeric character does not exist adjacent to the selected location, the routine 400 branches from operation 416 to operation 406. If an alpha-numeric character does exist at a location adjacent to the selected location, then the adjacent character is placed into the keyboard buffer at operation 418. In this manner the selection of a distinguishing character will cause the character located in the same cell to be entered. From operation 418, the routine 400 returns to operation 406, where the above-described process is repeated.

It will be appreciated that embodiments of the present invention provide a method, system, and apparatus for enabling keystroke input without the use of a keyboard input device. Although the invention has been described in language specific to computer structural features, methodological acts, and computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer-implemented method for receiving alpha-numeric input in the absence of a keyboard input device, the computer-implemented method comprising:
   displaying one or more alpha-numeric characters on a display screen, the one or more alpha-numeric characters being displayed by a setup utility provided by a basic input output system (BIOS) executing on a computer;
   determining, by way of a processor, whether input was received selecting a location on the display screen;
   determining, by way of the processor, whether the selected location contains one of the one or more alpha-numeric characters by examining a character located at the selected location and one or more adjacent characters; and
   in response to determining that the selected location contains one of the one or more alpha-numeric characters, entering the selected alpha-numeric character into a keyboard buffer by way of the processor such that the alpha-numeric character appears to have been typed on a keyboard.

2. The method of claim 1, wherein the alpha-numeric characters are displayed in a grid and wherein the alpha-numeric characters comprise each of the letters A-Z and the numbers 0-9.

3. The method of claim 2, wherein determining whether input was received selecting a location on the display screen comprises determining whether input was received selecting a location on the display screen in response to determining that a cursor is located within the grid.

4. The method of claim 3, wherein a distinguishing character is displayed adjacent to each alpha-numeric character in the grid, and wherein determining whether the selected location contains one of the one or more alpha-numeric characters by examining a character located at the selected location and one or more adjacent characters comprises determining whether a distinguishing character is present on two sides of the selected location.

5. The method of claim 4, further comprising:
   in response to determining that the selected location does not contain one of the one or more alpha-numeric characters, determining whether the selected location contains a distinguishing character;
   in response to determining that the selected location contains a distinguishing character, determining whether an alpha-numeric character exists adjacent to the selected location; and
   in response to determining that an alpha-numeric character exists adjacent to the selected location, entering the alpha-numeric character adjacent to the selected location into a keyboard buffer such that the alpha-numeric character appears to have been typed on a keyboard.

6. The method of claim 5, wherein the distinguishing character comprises a blank space.

7. The method of claim 6, further comprising:
   in response to determining that a distinguishing character is not present immediately to the left and right of the selected location, determining whether the character located at the selected location is part of a recognizable string of characters; and in response to determining that the character located at the selected location is part of a recognizable string, entering a character corresponding to the string into the keyboard buffer such that the entered character appears to have been typed on a keyboard.

8. The method of claim 7, wherein a selection is made using only a mouse or pen input device.

9. A non-transitory computer-readable storage medium having computer-executable instructions stored thereon that, when executed by a computer, cause the computer to:

display, by a setup utility provided by a basic input output system (BIOS) executing on a computer, a grid comprising one or more alpha-numeric characters, each of the alpha-numeric characters being displayed with a blank space on either side;

receive a selection at a location within the grid;

in response to receiving the selection, determining if the selected location within the grid contains an alpha-numeric character;

if the selected location within the grid contains an alpha-numeric character, determine whether a blank space is located on both sides of the selected location;

in response to determining that a space is located on both sides of the selected location, enter the character at the selected location into a keyboard buffer as if a keyboard had been utilized to type the character.

10. The non-transitory computer-readable storage medium of claim 9, further comprising instructions for:

if the selected location within the grid does not contain an alpha-numeric character, determining whether the selected location contains a blank space;

in response to determining that the selected location contains a blank space, determining whether an alpha-numeric character is adjacent to the selected location; and in response to determining that an alpha-numeric character is adjacent to the selected location, entering the alpha-numeric character that is adjacent to the selected location into a keyboard buffer as if a keyboard had been utilized to type the character.

11. The non-transitory computer-readable storage medium of claim 10, further comprising instructions for:

in response to determining that a space is not located on both sides of the selected location, determining whether the alpha-numeric character at the selected location is part of a recognizable string of characters; and in response to determining that the alpha-numeric character at the selected location is part of a recognizable string, entering a character corresponding to the recognizable string into the keyboard buffer such that the entered character appears to have been typed on a keyboard.

12. The non-transitory computer-readable storage medium of claim 11, wherein the selection is made using a non-keyboard input device.

13. The non-transitory computer-readable storage medium of claim 12, wherein the recognizable strings represent non-alphanumeric keystrokes.

14. The non-transitory computer-readable storage medium of claim 13, wherein the non-alphanumeric keyboard characters comprise an enter key, a backspace key, an escape key, or a function key.

15. The non-transitory computer-readable storage medium of claim 14, wherein the grid is formed using characters available in a text display mode.

16. A method for receiving alpha-numeric data entry without the use of a keyboard input device, the method comprising:

displaying a grid using text mode characters wherein substantially all of the locations within the grid include an alpha-numeric character, each of the alpha-numeric characters being displayed with a blank space on either side;

receiving a selection from a non-keyboard input device at a location within the grid, by way of the processor;

in response to receiving the selection, determining by way of the processor if the selected location within the grid contains an alpha-numeric character;

if the selected location within the grid contains an alpha-numeric character, determining by way of the processor whether a blank space is located on both sides of the selected location;

in response to determining that a blank space is located on both sides of the selected location, entering the character at the selected location into a keyboard buffer by way of the processor as if a keyboard had been utilized to type the character;

in response to determining that a space is not located on both sides of the selected location, determining by way of the processor whether the alpha-numeric character at the selected location is part of a recognizable string of characters corresponding to a non-alphanumeric keystroke;

in response to determining that the alpha-numeric character at the selected location is part of a recognizable string, entering the non-alphanumeric keystroke into the keyboard buffer by way of the processor such that the keystroke appears to have been typed on a keyboard;

if the selected location within the grid does not contain an alpha-numeric character, determining by way of the processor whether the selected location contains a blank space;

in response to determining that the selected location contains a blank space, determining by way of the processor whether an alpha-numeric character is adjacent to the selected location; and in response to determining that an alpha-numeric character is adjacent to the selected location, entering the alpha-numeric character that is adjacent to the selected location into a keyboard buffer by way of the processor as if a keyboard had been utilized to type the character.

* * * * *